United States Patent Office 2,923,155
Patented Feb. 2, 1960

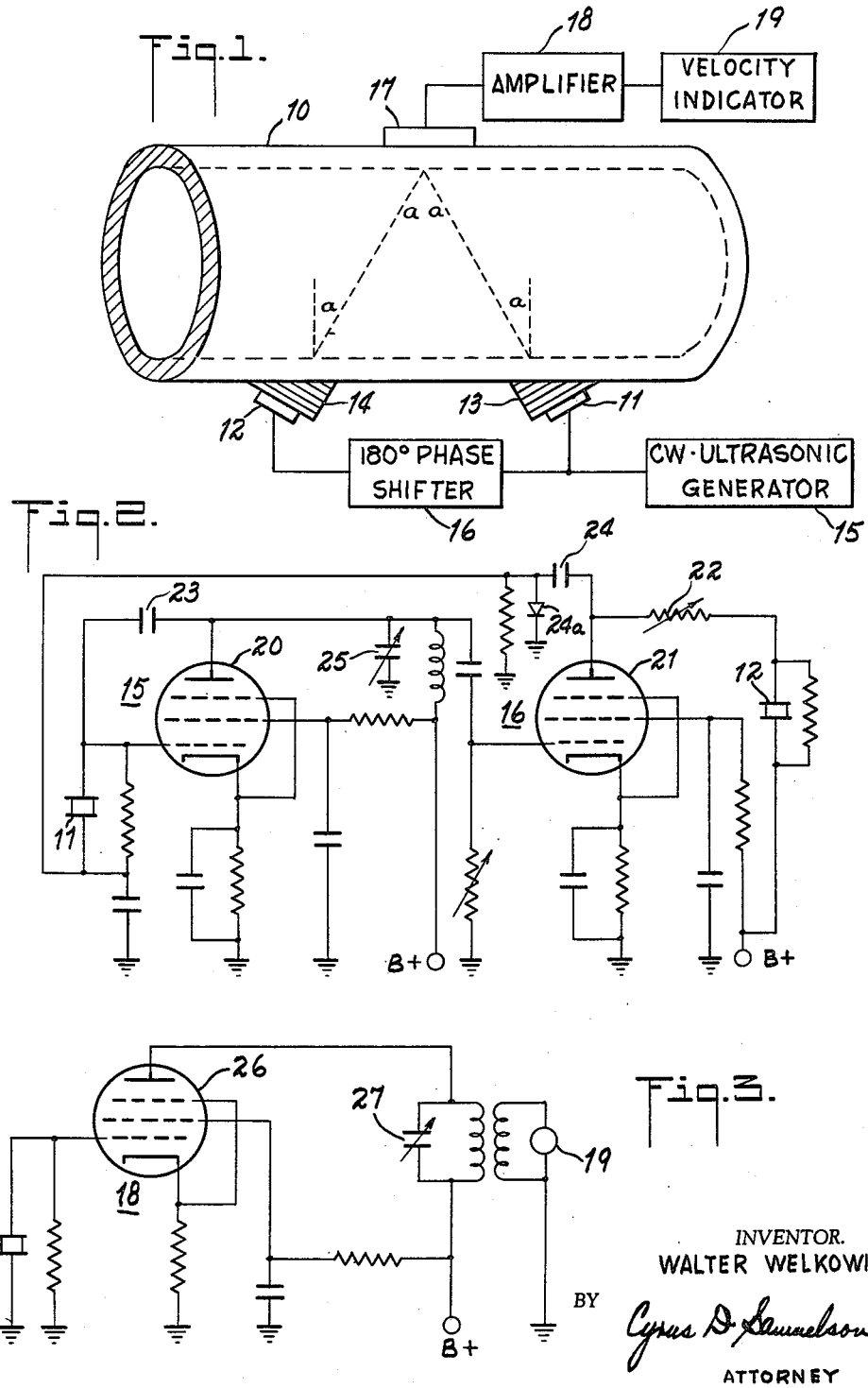

2,923,155

ULTRASONIC FLOWMETER

Walter Welkowitz, Metuchen, N.J., assignor to Gulton Industries, Inc., Metuchen, N.J., a corporation of New Jersey Application November 20, 1956, Serial No. 623,341

8 Claims. (Cl. 73—194)

My invention relates to ultrasonic flowmeters and in particular to those flowmeters which utilize continuous waves, which are independent of the fluid temperature and which are employed for making fluid flow velocity measurements using ultrasonic techniques.

The presently known and used ultrasonic flowmeters employ elaborate correction means in order to compensate for the changes in fluid temperature. These changes in fluid temperature affect the measurements because the device is dependent on the velocity of ultrasound in the medium. Various means, such as the use of pulse-actuated oscillators, pulse transmissions, supplementary transmission transducers and similar techniques, are employed in order to correct for the change in measurement of the fluid velocity because of variations in the fluid temperature.

Accordingly, it is a principal object of my invention to provide an ultrasonic flowmeter whose operation is independent of the fluid temperature.

It is a further object of my invention to provide an ultrasonic flowmeter whose operation depends only on the fluid velocity.

It is a still further object of my invention to provide an ultrasonic flowmeter which utilizes continuous waves.

Other objects and advantages of my invention will be apparent during the course of the following description.

In the accompanying drawings, forming a part of this application, and in which like numerals are employed to designate like parts throughout the same, Figure 1 is a side elevational view, partly diagrammatic, of a preferred embodiment of my invention, Figure 2 is a schematic diagram of a combined ultrasonic generator and 180° phase shifter, and Figure 3 is a schematic diagram of a combined amplifier and velocity indicator.

In the drawings, wherein, for the purpose of illustration, is shown a preferred embodiment of my invention, the numeral 10 designates the pipe or fluid flow-containing means in which the fluid flow velocity is to be measured. Transmitting transducers 11 and 12 are mounted on wedges 13 and 14 so that the beam directions are proper. Ultrasonic generator 15 is used to excite 11 and 12 and phase shifter 16 is used to adjust the phase between 11 and 12. Receiving transducer 17 receives and combines the signals from 11 and 12, the resultant signal voltage from 17 is amplified by amplifier 26 and the corresponding fluid velocity is indicated on meter 19.

In the embodiment shown in Figure 1, 11 and 12 are equidistant from 17. 16 is a 180° phase shifter. Under certain conditions, the distances from 11 to 17 and 12 to 17 may be unequal, in which event 16 would be adjusted to some phase difference other than 180°.

I prefer to utilize piezoelectric transducers formed of barium titanate or other ceramic, or of quartz or of any similar material but any suitable transducer type or material may be employed for 11, 12 and 17.

In Figure 1, 11 and 12 are spaced from 17 so that the path lengths from each are equal. Wedges 13 and 14 serve to give proper direction to the beams within pipe 10. If the two path lengths are identical, then the electrical signal drives to 11 and 12 should differ by 180° and 11 and 12 should be matched, essentially identical transducers.

When there is no fluid flow, the signals from 11 and 12 cancel at 17 because of the 180° difference in phase in the signals applied to 11 and 12 and because of the equal path lengths.

When there is fluid flow in 10, the signals arriving at 17 will differ in phase. The phase shift is a function of the angle at which the sound beam crosses the tube, the geometry and the fluid flow velocity, as given by the expression:

$$\Delta\phi = (2K \sin a) V \text{ flow}$$

where K is a constant of proportionality. This phase shift is not a function of the velocity of ultrasound in the fluid and consequently, is independent of the fluid temperature. The change in phase with fluid flow unbalances the cancellation at 17, causing an electrical signal being applied to amplifier 18 and resulting in an indication on 19. 19 may be a meter, oscilloscope or similar device which is calibrated in fluid flow so that the flow velocity may be read directly.

Figure 2 illustrates a preferred embodiment of C.W. ultrasonic generator 15 combined with 180° phase shifter 16. Tube 20 is in the oscillator circuit whose frequency is varied by capacitor 25. Oscillatory feedback is obtained through capacitor 23. Tube 21 is the phase shift tube. Resistor 22 is utilized to adjust the phase of the signal applied to 12 with respect to that applied to 11 so that the signals arriving at 17 from 11 and 12 cancel when there is no fluid flow. Capacitor 24 and rectifier 24a are provided to insure the amplitude stability of the circuit.

Figure 3 illustrates tuned amplifier 18 and indicator 19. Tube 26 is an amplifier whose tuning is adjusted by capacitor 27. 27 is tuned so that the frequency at the output of 26 corresponds with that applied to the grid of 26 by 17. When the ultrasonic signals received by 17 from 11 and 12 cancel (no fluid flow), 17 does not generate an electrical signal and there is no flow indication on 19. When the signals from 11 and 12 do not cancel at 17 (fluid flow), 17 generates an electrical signal which is amplified by 26 and there is flow indication on 19.

While I have shown only one embodiment of my invention, it will be recognized that this is only by way of illustration of general principles and that my invention is not limited to the particular means illustrated, but various changes, modifications and alterations may be made without departing from the spirit and scope of the invention as defined in the appended claims.

Having thus described my invention, I claim:

1. An ultrasonic flowmeter comprising fluid flow-conducting means, a pair of spaced electromechanically sensitive transmitting bodies mounted on said fluid flow-conducting means, an electromechanically sensitive receiving body mounted on said fluid flow-conducting means across from said transmitting bodies such that the distances from said receiving body to each of said transmitting bodies are substantially equal and such that one of said transmitting bodies is upstream with respect to said receiving body and one of said transmitting bodies is downstream with respect to said receiving body, an ultrasonic generator, the output of said ultrasonic generator being connected to said transmitting bodies such that ultrasonic waves are transmitted by said transmitting bodies, said transmitting bodies being positioned such that the ultrasonic waves transmitted by each of them are transmitted across said fluid flow-conducting means to said receiving body and in respective directions relative to the direction of fluid flow such that a component of the flow velocity is added to the velocity of the waves from one of said transmitting bodies and is subtracted from the velocity of the waves from the other of said transmitting bodies, means for shifting the phase of the output of said ultrasonic generator such that there is a difference in phase between the signals applied to said transmitting bodies by said ultrasonic generator such that the sum of the signals received by said receiving body from said transmitting bodies is substantially equal to zero when there is no fluid flow in said fluid flow-conducting means, and indicating means, the output of said receiving body being connected to said indicating means.

2. An ultrasonic flowmeter as described in claim 1 wherein said electromechanically sensitive transmitting bodies are piezoelectric.

3. An ultrasonic flowmeter as described in claim 1 wherein said electromechanically sensitive receiving body is piezoelectric.

4. An ultrasonic flowmeter as described in claim 1 wherein said electromechanically sensitive transmitting bodies are piezoelectric ceramics.

5. An ultrasonic flowmeter as described in claim 1 wherein said electromechanically sensitive transmitting bodies are composed largely of barium titanate.

6. An ultrasonic flowmeter as described in claim 1 wherein said electromechanically sensitive receiving body is a piezoelectric ceramic.

7. An ultrasonic flowmeter as described in claim 1 wherein said electromechanically sensitive receiving body is composed largely of barium titanate.

8. An ultrasonic flowmeter as described in claim 1 wherein said phase shifting means comprises a 180° phase shift network.

References Cited in the file of this patent

UNITED STATES PATENTS

| | | |
|---|---|---|
| 1,881,543 | Hartig et al. | Oct. 11, 1932 |
| 2,515,221 | Henning | July 18, 1950 |
| 2,607,858 | Mason | Aug. 19, 1952 |

FOREIGN PATENTS

| | | |
|---|---|---|
| 976,924 | France | Nov. 1, 1950 |